(12) United States Patent
Chavan Dafle et al.

(10) Patent No.: US 9,808,936 B2
(45) Date of Patent: Nov. 7, 2017

(54) TWO-PHASE GRIPPER TO REORIENT AND GRASP

(71) Applicant: Massachusetts Institute of Technology, Cambridge, MA (US)

(72) Inventors: Nikhil Narsingh Chavan Dafle, Cambridge, MA (US); Alberto Rodriguez Garcia, Medford, MA (US); Matthew T. Mason, Pittsburgh, PA (US)

(73) Assignees: Massachusetts Institute of Technology, Cambridge, MA (US); Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/200,110

(22) Filed: Jul. 1, 2016

(65) Prior Publication Data
US 2017/0036354 A1 Feb. 9, 2017

Related U.S. Application Data

(60) Provisional application No. 62/200,283, filed on Aug. 3, 2015.

(51) Int. Cl.
*B25J 15/00* (2006.01)
*B25J 15/12* (2006.01)
*B25J 15/02* (2006.01)

(52) U.S. Cl.
CPC ....... *B25J 15/0004* (2013.01); *B25J 15/0042* (2013.01); *B25J 15/0253* (2013.01); *B25J 15/12* (2013.01); *Y10S 294/902* (2013.01)

(58) Field of Classification Search
CPC B25J 15/0004; B25J 15/0033; B25J 15/0038; B25J 15/0042; B25J 15/0253; B25J 15/12; Y10S 294/902

(Continued)

(56) References Cited

U.S. PATENT DOCUMENTS 1,049,150 A * 12/1912 Robail ............ B66C 1/02
294/119.1
3,322,455 A * 5/1967 Gressbach ............ B66C 1/422
294/104

(Continued)

OTHER PUBLICATIONS

Gorce; "Design methodology approach for flexible grippers,"; Journal of Intelligent and Robotic Systems; Mar. 1996; pp. 307-328; vol. 1; Kluwer Academic Publishers; Netherlands.

(Continued)

*Primary Examiner* — Dean Kramer
(74) *Attorney, Agent, or Firm* — Sam Pasternack; MIT Technology Licensing Office

(57) ABSTRACT

Two-phase gripper. The gripper reorients and grasps an object while being picked up. The gripper includes a parallel jaw gripper including a pair of opposed, two-phase fingers, each finger including a cavity covered by an elastic strip wherein the elastic strip includes a point contact. Closure of the jaws of the gripper on an object at a first relatively lower force results in contact with lower friction between the point contact on the elastic strip on the fingers and the object allowing the object to rotate under gravity as the gripper is raised. Thereafter, closure of the jaws of the gripper on the object at a second relatively higher force causes the elastic strip to receded into the cavity resulting in multi-point contact with higher friction between the fingers and the object to securely grasp the object. In a preferred embodiment, the cavity is a Y-shaped groove and the object is cylindrical or prismatic.

4 Claims, 2 Drawing Sheets

(58) Field of Classification Search
USPC ............. 294/99.1, 86.4, 119.1, 902; 414/783
See application file for complete search history.

(56) References Cited

U.S. PATENT DOCUMENTS

| | | | | |
|---|---|---|---|---|
| 3,954,194 | A * | 5/1976 | Stedman | B60P 1/5433 294/106 |
| 4,740,025 | A * | 4/1988 | Nelson | B01L 9/50 294/902 |
| 6,227,589 | B1 * | 5/2001 | Brown | B65H 29/003 198/803.7 |
| 7,406,362 | B2 * | 7/2008 | Hariki | B25J 9/1612 414/783 |
| 7,658,119 | B2 * | 2/2010 | Loeb | B25J 13/084 73/862.046 |
| 8,220,853 | B2 * | 7/2012 | Maeder | B65H 29/003 294/106 |
| 2012/0253516 | A1 * | 10/2012 | Iida | B25J 9/1669 700/258 |

OTHER PUBLICATIONS

Salisbury; "Articulated Hands: Force Control and Kinematic Issues,"; The International Journal of Robotics Research; Mar. 1982; pp. 4-17; vol. 1; Stanford University; Stanford, California.

Fearing; "Simplified Graspping and Manipulation with Dextrous Robot Hands,"; IEEE Journal on Robotics and Automation; Dec. 1986; pp. 188-195; vol. 2, No. 4; IEEE; New Jersey.

Brock, "Enhancing the Dexterity of a Robot Hand Using Controlled Slip,"; IEEE Int Conf. on Robotics and Automation; 1988; pp. 249-251; vol. 1; IEEE Computer Society Press; USA.

Omata; "Planning Reorientation of an Object with a Multifingered Hand,"; IEEE Int Conf. on Robotics and Autom.; 1994, pp. 3104-3110; vol. 4; IEEE; USA.

Cherif et al.; "Planning Quasi-static Fingertip Manipulations for Reconfiguring Objects,"; IEEE T Robotic Autom; Oct. 1999; pp. 837-848; vol. 15; IEEE; USA.

Rus; "In-Hand Dexterous Manipulation of Piecewise-Smoot 3-D Objects,"; Int J Robot Res: 1999; pp. 355-381; vol. 18, No. 4; USA.

Goldberg; "Orienting Polygonal Parts without Sensors," Algorithmica; Oct. 1993; pp. 201-225; vol. 10, No. 204; Springer-Verlag; New York City, New York.

Lynch; "Stable Pushing: Mechanics, Control- Lability, and Planning," Int J Robot Res; 1996; pp. 533-556; vol. 15, No. 6; USA.

Rao; "Complete Algorithms for Feeding Polythedral Parts Using Pivot Grasps," IEEE Trans. on Robotics and Autom., Apr. 1996; pp. 331-342; vol. 12, No. 2; IEEE; USA.

Chavan Dafle; "Extrinsic Dexterity: In-Hand Manipulation with External Forces,"; IEEE Int Conf. on Robotics and Automation; 2014; IKEE; USA.

Holladay; "A General Framework for Open-Loop Pivoting,"; IEEE Int Conf. on Robotics and Automation; May 2015, IKEE: USA.

Asada; "Kinematic Analysis of Workpart fixturing for Flexible Assembly with Automatically Reconfigurable Fixtures,"; IEEE Journal of Robotics and Autom.; Jun. 1985; pp. 86-94; vol. 1, No. 2; IEEE; USA.

Rodriguez; "Effector Form Design for 1dof Planar Actuation,"; IEEE Int Conf. on Robotics and Autom.; May 2013; pp. 349-356; IEEE; USA.

Kock; "Robot Concept for Scalable, Flexible Assembly Automation: A Technology Study on a Harmless Dual-Armed Robot,"; IEEE Int Symp. on Assem and Manuf.; May 2011; pp. 1-5; IEEE; USA.

Hedelind; "Requirements on Flexible Robot Systems for Small Parts Assembly: A Casa Study,"; IEEE Int Symposium on Assem and Manuf.; May 2011; pp. 1-7; IEEE; USA.

Goyal; "Planar Sliding of a Rigid Body with Dry Friction: Limit Surfaces and Dynamics of Motion,"; Jan. 1998; Cornell University: New York, USA.

Sinha; "A Contact Stress Model for Determining Forces in an Equilibrium Grasp": Technical Reports; Aug. 1989; University of Pennsylvania Scholarly Commons: PA, USA.

\* cited by examiner

FIG. 5A
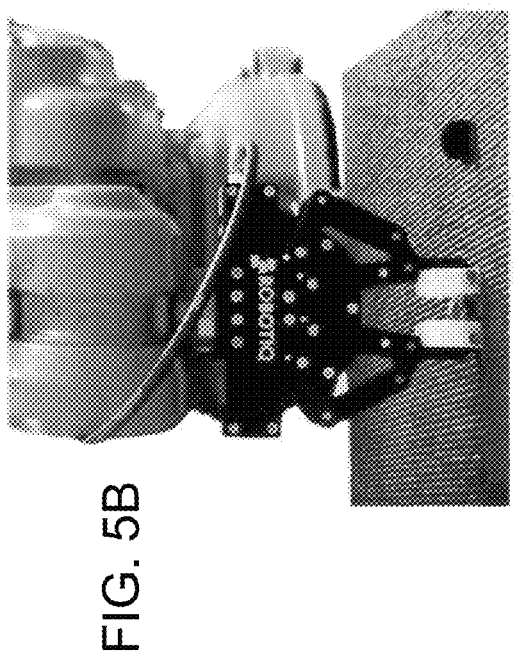
FIG. 5B
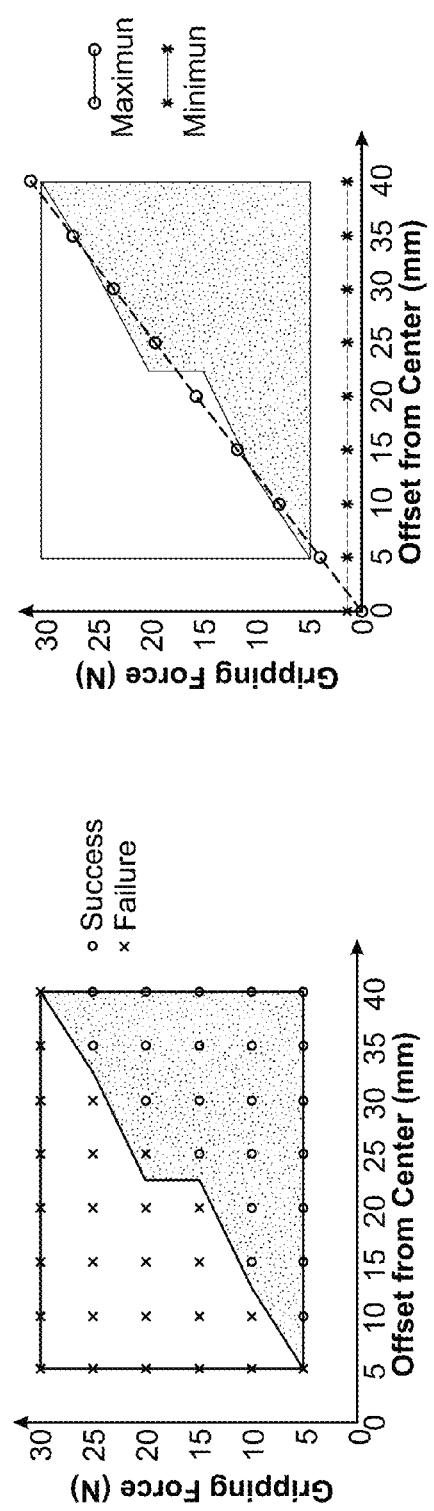
FIG. 6
FIG. 7

TWO-PHASE GRIPPER TO REORIENT AND GRASP

This application claims priority to U.S. provisional application Ser. No. 62/200,283 filed on Aug. 3, 2015, the contents of which are incorporated herein by reference.

This invention was made with Government support under Grant No. IIS-1427050 awarded by the National Science Foundation. The Government has certain rights in the invention.

BACKGROUND OF THE INVENTION

This invention relates to two-phase fingers to passively reorient objects while picking them up and thereafter grasping them securely.

Robotic research has long been interested in the ability to grasp and manipulate a large and varied set of objects. Due to stringent requirements on speed, precision, and reliability, the automation industry however has preferred simple gripping solutions that can accurately localize and securely grasp a small set of objects [1]. Furtherance, the need for object manipulation at assembly is often bypassed by specialized part feeders which present the parts in a pose suitable for picking and use.

Robotics research has been driven, and is still driven in part today, by the needs of factory automation. The last two decades have seen a remarkable evolution of robotic manipulators leading to a precision of 30 microns, speeds of a few meters per second, the availability of force feedback and force control, as well as safety and compliance. Unfortunately, the lack of robust solutions for object manipulation has limited the role of these remarkable machines to mostly pick-and-place.

Getting an object in a fitting pose for an assembly, either by picking it up in the required pose or by regrasping it, is crucial for the success of the assembly. Often, the approach practiced in industry is to avoid the need for regrasping. An ancillary system deals with part feeding by singulating and locating a parts from a pile by passing them through specially designed pathways that reorient them and present them to the robot in an already suitable pose. This approach, although proven robust, impinges on important space, time, and set-up requirements, leading to huge costs in the set-up of a new assembly line. When the product changes, little of the set-up can be reused. These factors discourage the possibility of assembly automation for products with short upgrade cycle time.

The large market for automation of electronic product assembly and the demand from small scale industries for affordable automation are two major contributors to the rising interest in flexible automation. It aims for automation systems that are modular, easy to set up and adapt, and easy to integrate among human co-workers [23, 24]. Dexterity has been identified as one of the major roadblocks and essential capabilities needed to address the challenges in next-generation automation [25]. Rather than general-purpose dexterity, we explore a solution to perform a particular reorientation precisely and reliably, and with the ability to be easily adaptable to other parts and systems with minimal reconfiguration.

It is therefore an object of the invention to provide a two-phase gripper that allows reorientation of an object followed by secure grasping.

SUMMARY OF THE INVENTION

The two-phase gripper of the invention to reorient and grasp an object while being picked up includes a parallel jaw gripper including a pair of opposed, two-phase fingers, each finger including a cavity covered by an elastic strip, the elastic strip including a point contact. Closure of the jaws of the gripper on the object at a first, relatively lower force results in contact at lower friction between the point contact on the elastic strip on the ringers and the object allowing the object to rotate under gravity as the gripper is raised. Closure of the jaws of the gripper on the object at a second, relatively higher force causes the elastic strip to recede into the cavity resulting in multi-point contact with higher friction between the fingers and the object to securely grasp the object. In a preferred embodiment, the cavity is a V-shaped groove. Suitable objects for reorientation and grasping include cylindrical or prismatic shapes. In a preferred embodiment, the contact on the elastic strip may be cured rubber.

BRIEF DESCRIPTION OF THE DRAWINGS

FIG. 5a is a perspective view of the two-phase fingers of the invention mounted on a gripper.

FIG. 5b is another perspective view showing the two-phase fingers of the invention mounted on a gripper.

FIG. 6 is a graph of gripping force versus offset from center showing successful and failed pivoting experiments.

FIG. 7 is a graph of gripping force versus offset from center showing estimation of limits on the gripping force analytically for successful execution of pivoting.

DESCRIPTION OF THE PREFERRED EMBODIMENT

We present a novel design of two-phase fingers which eliminate the need for part feeders by grasping and passively reorienting a set of parts. Two-phase refers to a discrete change in the contact geometry between fingers and part as the gripping force increases, where the gripper function-switches from passive reorientation of the part to a secure grasp. In particular, this patent application focuses on grasping and reorienting cylindrical or prismatic parts, very frequent geometries in Industrial assembly settings [2]. We demonstrate how the two-phase gripper reorients cylindrical parts to an upright pose and grasps them securely in an uninterrupted and continuous motion.

Figure 1:
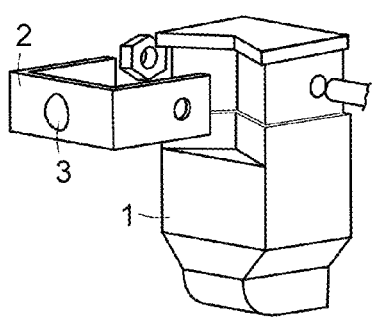
FIG. 1 is a perspective view of the gripper of the invention illustrating a V-groove cavity, elastic strip and point contact.

FIG. 1 illustrates the two-phase finger in action. The design is composed of a small contact point 3 on an elastic strip 2 mounted over a V-groove cavity 1. When an object is grasped with low gripping force, it pivots about the contact points on the strips until it aligns with gravity. As the gripping force increases, the elastic strips recede into the cavities, and the object sits into the V-grooves securing the grasp.

We demonstrate the design by instrumenting two commercially available grippers (2-Finger 85 from Robotiq, and WSG32 from Weiss Robotics) and testing them with three different object types. The experiments validate the effectiveness of the design in reorienting and securing the parts.

FIG. 1 shows that the design of the two-phase finger can be retrofitted to any common parallel-jaw gripper.

In this application we focus on a particular case commonly encountered in assembly operations—reorienting cylindrical parts from a horizontal pose on a table or a conveyor belt to an upright pose required for assembly. We focus on cylindrical parts which are one of the most common geometries within industrial assembly, with the goal of providing a reliable and fast method for picking, reorienting and securing.

The functional requirements of the gripper are as follows:
1) Passive reorientation of a cylindrical object from a horizontal pose to an upright pose.
2) Secure the grasp on the object in the new upright orientation.

The motion of a grasped object is governed by the kinematic and Motional properties of all contacts it makes. To let an object pivot under gravitational three, contacts must offer minimal frictional torque, characteristic of contacts with small area. On the other hand, to localize and to hold the object securely after it pivots, specific kinematic constraints and significant frictional resistance needs to be provided. The proposed design aims to fit both needs.

Figure 2:
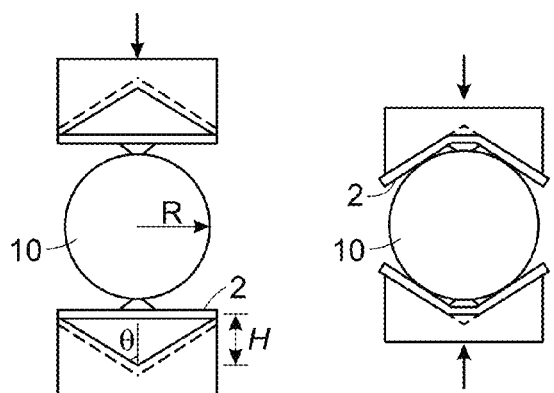
FIG. 2 is a plan view of the gripper of the invention illustrating the two phases of the gripper.

We rely on a built-in mechanism in the fingertips to change the finger-object contact geometry from point contact with low-friction to multi-point contact with high friction. The change on the contact geometry is triggered by the magnitude of the gripping force. The functionality is depicted in FIG. 2. In the figure, an object 10 is first gripped with point contact to allow pivoting. Thereafter, as the jaws close on the object 10 the elastic strip 2 deforms and the cylindrical object 10 is securely grasped by the gripper.

The cavity 1 is meant to provide kinematic constraints that force the object to align to an upright pose, and later maintain that pose even when the robot or hand is freely moved.

This application focuses on cylindrical objects, and consequently a canonical V-groove gives an appropriate geometry for the cavity. Given the radius R of the cylinder to pick, we chose the values for the depth of the cavity H and its angle 2θ so that the fingers will not touch each other when holding the object. Otherwise the object would be able to move even with the gripper fully closed. We impose then:

$$H \leq R/\sin\theta \qquad (1)$$

Figure 3A:
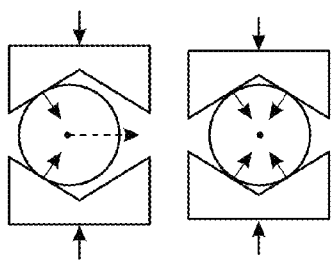
FIG. 3a is a schematic illustration of the top view of an object in the cavity.
Figure 3A:
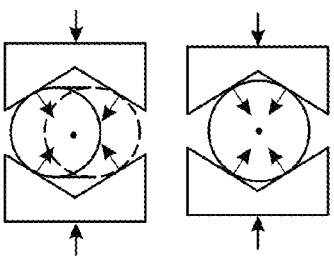
Figure 3B:
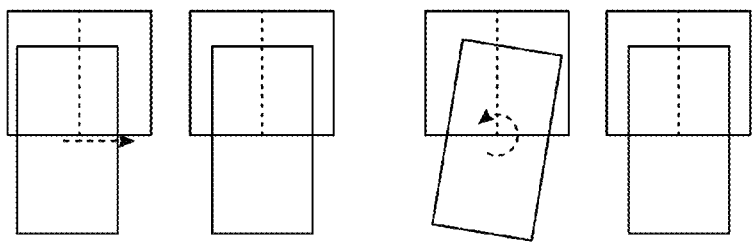
FIG. 3b is a side view of an object in the cavity.

As illustrated in FIG. 3, the expectation is that the kinematic constraints offered by the V-grooves will push the cylindrical object to the center of the cavity and make it vertical from anywhere within the groove. After the alignment, and when combined with friction from contacts within the V-groove, we get a force-closure grasp on the object [26].

The role of the elastic strip 2 is to facilitate the transition from a point contact to patch contact as the gripping force increases. At low gripping force, we would like the elastic strip 2 to provide high stiffness to maintain a point contact between fingers and object, and low stiffness as fee gripping force increases above certain threshold so that the snip recedes into the cavity and allows surface contact between the finger and the object. However, practically achieving such "softening spring" behavior can be involved.

For the purpose of prototyping, we used a rubber band with a preload as the elastic strip. The required stillness value for the elastic strip is bounded by two constraints based on the desired application.

Let $\delta_{pivot}$ be a maximum allowable deflection in the strip for the gripping force suitable for pivoting the object $F_{pivot}$. This gives a low bound on the stiffness of the strip (K).

$$K \geq F_{pivot}/2\delta_{pivot} \qquad (2)$$

Similarly, let $\delta_{grasp}$ be the minimum deflection needed in the strip when the object is held in the V-groove cavities giving an upper bound on the stiffness of the strip.

$$K \leq F_{grasp}/2\delta_{grasp} \qquad (3)$$

where $\delta_{grasp}=2H(1-\sin\theta)/\cos\theta$ is the minimum extension needed in the strip so that it can recede and sit in the cavity and $F_{grasp}$ is the high gripping force applied for grasping the object. $F_{grasp}$ is limited by the maximum grasping force the gripper can apply.

We will proceed under the assumption that as long as the stiffness of the strip satisfies (2) and (3), the variation in the stiffness does not affect the functionality of the gripper, and that the stiffness of the strip remains constant throughout the operation.

The role of the point contact 3 on the elastic strip 2 is to act as a hinge to support and allow minimal frictional resistance to the rotation of the object in the fingers under gravity. Though ideally we want point contacts between the object and the lingers for pivoting, in reality they are patch contacts with small area.

We now explain a typical operation for the two-phase gripper. The complete manipulation task can be broken down into the following steps:
1) The two-phase gripper reaches over a cylindrical object lying on a flat surface with its longitudinal axis horizontal.
2) The fingers hold the object offset from the center of mass with a low gripping force, just sufficient to prevent the object from slipping.
3) The object is raised, while it pivots about the axis between the finger contacts, until it is completely lifted from the surface and aligned upright in the gripper.
4) The grip on the object is tightened, which passively shifts the cylinder to the center of the cavity and secures the grasp.

Figure 4:
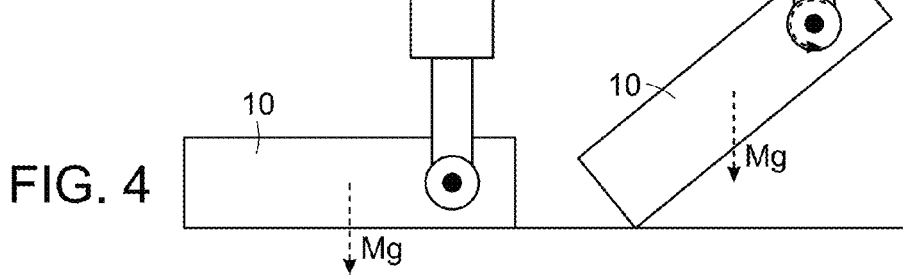
FIG. 4 is a schematic diagram illustrating the pivoting phase of the two-phase gripper.

We analyze now the mechanics of the pivoting manipulation and the criterion to select an appropriate value for the gripping force. FIG. 4 shows the schematic of a cylinder 10 being grasped and lifted.

The gripping force plays a key role in determining the success of the pivoting operation. It must suffice to prevent slipping of object, but needs to be small enough to allow pivoting under gravity. In order to lift the object without slipping, the linear frictional force at the finger contacts must balance the gravitational force. This determines lower bound on the gripping force during the pivoting phase:

$$F_{pivot} \geq Mg/\mu \qquad (4)$$

where M is the mass of the object, g is the gravitational acceleration and μ is the linear coefficient of friction at the finger contacts.

The upper bound on $F_{pivot}$ is determined by the limit on the Motional resistance to allow pivoting, which to a large extent is determined by the size of the contact area between the part and fingers. Following, we compare two different approaches to estimate the upper bound, first with idealized point contacts and second with more realistic small patch contacts.

An idealized point contact with friction can transmit forces along three linear dimensions, one along the contact normal and two along the contact plane, in the ideal case, it does not offer any torsional resistance at contact [26].

This means that, as long as there is an offset between the center of gravity (CG) of the object and the finger contact locations, for any positive value of the gripping force, the object is free to pivot about the fingertips under the effect of gravity. Effectively, there is no upper bound on $F_{pivot}$.

In practice, it is hardly possible to get point contacts. There is always a finite surface area at contacts that can provide some degree of torsional resistance.

We assume those contacts to be planar patches. A planar contact with friction can transmit a torque about the contact normal in addition to the forces along three directions as in the previous case. That torque, specially when an object is picked close to the center of gravity with high force, can counterbalance the gravitational torque and prevent the part from pivoting, which can cause problems.

The simplest approximation to capture torsional friction is to model a patch contact as a point contact that transmits a torque about that point with a certain torsional coefficient of friction ($\mu_{tors}$), producing the frictional torque $\mu_{tors}F_{pivot}$. This model is often known as soft contact model [26]. However, estimation of $\mu_{tors}$ is not trivial and in general depends on the contact geometry, so needs to the updated when the contact geometry changes.

There are more involved ways to model patch contacts. A model commonly used in manipulation planning is the limit surface model [27]. There are other models that are based on finite element approximations [28] which do not assume explicit knowledge of the torsional friction coefficient.

The focus of this invention is the mechanical, design of the two-phase fingers, and for the sake of simplicity, we will assume contacts to be circular, and finitely approximate them as a rigid set of point contacts forming a polygon concentric with the circular patch. The total frictional torque on the object can then be approximated as:

$$\tau_{fric} = \mu r F_{grip} \quad (5)$$

where $F_{grip}$ is the gripping force and r is the radius of the circular patch contact.

For an object to rotate in the fingers, the frictional torque created at the finger contacts must be smaller than the moment created by the gravitational force on the object, $\tau_{fric} \leq MgL \cos \phi$, which sets an upper bound on the gripping force:

$$F_{pivot} MgL \cos \phi / \mu r \quad (6)$$

where L is a moment arm, the offset between the CG of the object and the fingertip location, and $\phi$ is the angle between the axis of the cylinder and the horizontal plane. $\phi$ changes from 0° to 90° as the object pivots from the horizontal pose to the upright pose. Though the moment arm reduces as the object slowly pivots, the inertia gained by the object can help it to pivot as the moment approaches zero. So, we only check if the following constraint holds true when the part is in the horizontal configuration:

$$F_{pivot} \leq MgL/\mu r \quad (7)$$

In summary, constraints (1)-(7) collectively define the geometry of the V-groove cavity, stillness of the elastic strip over it and foe limits on the gripping force to pivot the object about the finger contacts.

We now discuss the experimental validation of the effectiveness of the two-phase fingers. In particular we focus on the validation of the small patch models for the linger contacts and the effect of changes in the grasping location on the required gripping force for pivoting.

For prototyping, we used 3D printed fingers with a V-groove cavity, and a rubber band with preload for the elastic strip. The point contact on the strip is made by placing a drop of liquid rubber on the strip and then curing it. The elastic strip is held in place using a cap screw.

We attached these lingers to two different grippers: Weiss Robotics WSG-32, with force feedback and force control, and the Robotiq 2-Finger 85 without force control. See FIG. 5a. Both the grippers were mounted on an ABB IRB 140 industrial manipulator. We chose three different cylinders with different diameters and materials and one with a square flange, as our test objects.

FIG. 5b shows a typical experimental setup with two of the test objects, the two-phase gripper and the manipulator. For every experimental trial, we lifted the object from the ground with a low gripping force in a range suitable for pivoting the object and then grasped it tightly after it is fully lifted from, the ground. The attempt is counted as a success if the part is reoriented to an upright pose without slipping and securely held in the V-groove at the end of the procedure. We conducted this experiment for multiple gripping forces, and at multiple gripping locations along the length of the cylinder, for all the tested objects. FIG. 6 shows the results of those experiments for one of the objects, and for comparison, FIG. 7 shows our expectation from the discussed pivoting models.

As discussed above, we approximate the contacts between an object and the fingertips by small patch contacts which offer small but non-negligible frictional torque about the contact normal. To let the object pivot between contacts, the gripping force must satisfy constraint (7).

As we pick an object farther away from its center of gravity, the moment arm L increases making the range of compatible gripping forces for pivoting bigger.

We conducted a series of experiments of picking up a cylindrical object at varying offset distances from the center with different gripping forces. FIG. 6 shows the outcome of the experimental trials. The run is counted as a success if the object pivoted under gravity without slipping, and a failure otherwise. Due to the limitations of the gripper used, we limited the range for the gripping forces to the region 5N-30N. The figure shows the increase in the valid gripping force region as the object is grasped farther away from the center.

FIG. 7 shows the estimation of the limits on the gripping force found analytically for successful execution of pivoting. The analytical model used here assumes circular patch contacts of 3 mm diameter at the fingertips, which give a good match for the fingers used. To evaluate the coefficient of friction between the object and the fingers, we made rigid fingers with the same rubber material at the tips. We picked the desired object and attempted to push it linearly in the grasp. Based on the gripping force and pushing force data generated from multiple experiments the linear coefficient of friction for the finger-object pair is estimated to be 0.6.

Following the 'no slip' criterion governing the minimum force at the fingers (4) and 'minimal torsional resistance' criterion governing the maximum force (7), we calculated the bounds on the gripping force which are shown in FIG. 7. They are overlapped with the regions of success and failure trials observed during the experiments. Close resemblance of analytical and experimental results show that, given the mass of the object and the coefficient of friction between the fingers and the object, we can model the process well enough to predict the gripping force required to successfully operate the two-phase gripper.

This patent application has disclosed the design of a two-phase gripper, composed of a standard parallel-jaw gripper instrumented with special fingers capable of passively reorienting and securely holding a set of objects. The contact geometry between the fingers and the object changes from a point contact, which allows reorientation through pivoting, to a multi-point contact, which secures the grasp in the new orientation, as the gripping force increases. We focus on the application of the two-phase gripper to reorientation of cylindrical objects from a horizontal to as upright pose and then securely grasping them.

The two-phase fingers disclosed herein can be retrofitted to any parallel-jaw gripper of an appropriate size. The Idea of two-phase fingers can be easily extended to different shapes of objects by reconfiguring the cavity in the fingers.

The numbers in square brackets refer to the references listed herein. The contents of all of these references are incorporated herein by reference in their entirety.

It is recognized that modifications and variations of the present invention will be apparent to those of ordinary skill in the art and it is intended that all such modifications and variations be included within the scope of the appended claims.

REFERENCES

[1] G. Monkman, S. Hesse, R. Steinmann, and H. Schunk, *Robot grippers*. John Wiley and Sons, 2006.
[2] P. Gorce and J. Fontaine, "Design methodology approach for flexible grippers," *Journal of Intelligent and Robotic Systems*, vol. 15, no. 3, pp. 307-328, 1996.
[3] J. K. Salisbury Jr., "Kinematic and Force Analysis of Articulated Hands," PhD Dissertation, Stanford University, 1982.
[4] J. Salisbury and J. Craig, "Articulated hands: Force control and kinematic issues," *Int J Robot Res*, vol. 1, no. 1, pp. 4-47, 1982.
[5] R. Fearing, "Simplified grasping and manipulation with dexterous robot hands," *IEEE Journal of Robotics and Automation*, vol. 2, no. 4, pp. 188-495, 1986.
[6] D. Brock, "Enhancing the dexterity of a robot hand using controlled slip," in *IEEE Int Conf. on Robotics and Automation*, vol. 1, 1988, pp. 249-251.
[7] T. Omata and K. Nagata, "Planning reorientation of an object with a multifingered hand," in *IEEE Int Conf. on Robotics and Autom.*, 1994, pp. 3104-3110.
[8] M. Cherif and K. Gupta, "Planning quasi-static fingertip manipulations for reconfiguring objects," in *IEEE T Robotic Autom*, vol. 15, 1999, pp. 837-848.
[9] D. Rus, "In-Hand Dexterous Manipulation of Piecewise-Smooth 3-D Objects," for *Int J Robot Res*, vol. 18, no. 4, pp. 355-381, 1999.
[10] N. J. Nilsson, "Shakey the robot," SRI Int, Tech. Rep. 323, 1984.
[11] M. Erdmann and M. T. Mason, "An exploration of sensorless manipulation," in *IEEE Int Conf. on Robotics and Autom.*, vol. 3, April 1986, pp. 1569-1574.
[12] K. Y. Goldberg, "Orienting Polygonal Parts without Sensors," *Algo-rithmica*, vol. 10, no. 204, pp. 201-225, 1993.
[13] K. M. Lynch and M. T. Mason, "Stable pushing: Mechanics, control-lability, and planning," *Int J Robot Res*, vol. 15, no. 6, pp. 533-556, 1996.
[14] A. Rao, D. Kriegman, and K. Goldberg, "Complete algorithms for feeding polyhedral parts using pivot grasps," *IEEE Trans. on Robotics and Autom.*, vol. 12, no. 2, pp. 331-342, 1996.
[15] N. Chavan Dafle, A. Rodriguez, R. Paolini, B. Tang, S. Srinivasa, M. Erdmann, M. Mason, I. Lundberg, H. Staab, and T. Fuhlbrigge, "Extrinsic dexterity: in-hand manipulation with external forces," in *IEEE Int Conf. on Robotics and Automation*, 2014.
[16] A. Holladay, R. Paolini, and M. T. Mason, "A general framework for open-loop pivoting," in *IEEE Int Conf on Robotics and Autom.*, 2015.
[17] F. Wilson and J. Holt, *Handbook of Fixture Design*. McGraw-Hill, 1962.
[18] H. Asada and A. By, "Kinematic analysis of workpart fixturing for flexible assembly with automatically reconfigurable fixtures," *IEEE Journal of Robotics and Autom.*, vol. 1, no. 2, pp. 86-94, June 1985.
[19] D. Blanding, *Exact Constraint: Machine Design Using Kinematic Principles*. ASME Press, New York, 1999.
[20] K. Lakshminarayana, "Mechanics of form closure," Technical Report 78-DET-32, *ASME*, 1978.
[21] F. Reuleaux, *The Kinematics of Machinery: Outlines of a Theory of Machines*. Macmillan, 1876.
[22] A. Rodriguez and M. T. Mason, "Effector form design for 1dof planar actuation," in *IEEE Int Conf. on Robotics and Autom.*, 2013, pp. 349-356.
[23] S. Kock, T. Victor, B. Matthias, H. Jerregard, M. Kallman, I. Lundberg, R. Mellander, and M. Hedelind, "Robot concept for scalable, flexible assembly automation: A technology study on a harmless dual-armed robot," in *IEEE Int Symp. on Assent and Manuf.*, May 2011, pp. 1-5.
[24] M. Hedelind and S. Kock, "Requirements on flexible robot systems for small parts assembly: A case study," in *IEEE Int Symposium on Assem and Manuf.*, May 2011, pp. 1-7.
[25] Robotics V O, "A Roadmap for U.S. Robotics: From Internet to Robotics," Tech. Rep., 2013.
[26] D. Prattichizzo and J. Trinkle, *Grasping*, B. Siciliano and O. Khatib, Eds. Springer Berlin Heidelberg, 2008.
[27] S. Goyal, "Planar sliding of a rigid body with dry friction: limit surfaces and dynamics of motion," PhD Dissertation, Department of Mechanical Engineering, Cornell University, 1989.
[28] P. R. Sinha, "A Contact Stress Model for Determining Forces in an Equilibrium Grasp," *University of Pennsylvania Dept. of Computer and Information Science Tech Report No. MS-CIS*-90-19, 1989.

What is claimed is:

1. Two-phase gripper to reorient and grasp an object while being picked up comprising:
a parallel jaw gripper including a pair of opposed, two-phase fingers, each finger including a cavity covered by an elastic strip, the elastic strip including a point contact providing minimal frictional resistance to rotation of the object and wherein the elastic strip has a stiffness, K, such that $F_{pivot}/2\delta_{pivot} \leq K \leq F_{grasp}/2\delta_{grasp}$ wherein $\delta_{pivot}$ is maximum allowable deflection for a first relatively lower force $F_{pivot}$ suitable for pivoting; and wherein $\delta_{grasp}$ is minimum extension of the elastic strip to recede into the cavity for a second relatively higher force;
whereby closure of the jaws of the gripper on the object at the first relatively lower force results in contact with lower friction between the point contact on the elastic strip and on the fingers and the object allowing the object to rotate under gravity as the gripper is raised; and
whereby closure of the jaws of the gripper on the object at the second relatively higher force causes the elastic strip to recede into the cavity resulting in multi-point contact with higher friction between the fingers and the object to securely grasp the object.

2. The gripper of claim 1 wherein the cavity is a V-shaped groove.

3. The gripper of claim 1 wherein the object is a cylinder or prismatic object.

4. The gripper of claim 1 wherein the point contact on the elastic strip is cured rubber.

\* \* \* \* \*

UNITED STATES PATENT AND TRADEMARK OFFICE
CERTIFICATE OF CORRECTION

PATENT NO. : 9,808,936 B2
APPLICATION NO. : 15/200110
DATED : November 7, 2017
INVENTOR(S) : Nikhil Narsingh Chavan Dafle, Alberto Rodriguez Garcia and Matthew T. Mason It is certified that error appears in the above-identified patent and that said Letters Patent is hereby corrected as shown below:

On the Title Page

In the Abstract, Column 2, Line 39, "Y-shaped" should read --V-shaped--.

Signed and Sealed this
Second Day of January, 2018

Joseph Matal
*Performing the Functions and Duties of the*
*Under Secretary of Commerce for Intellectual Property and*
*Director of the United States Patent and Trademark Office*